(12) United States Patent
Feng et al.

(10) Patent No.: US 9,616,611 B2
(45) Date of Patent: Apr. 11, 2017

(54) METHOD FOR MAKING A BALL SHAPED PRODUCT

(71) Applicant: San Fang Chemical Industry Co., Ltd., Kaohsiung (TW)

(72) Inventors: Chung-Chih Feng, Kaohsiung (TW); I-Peng Yao, Kaohsiung (TW); Ko-Feng Wang, Kaohsiung (TW); Kai-Feng Kang, Kaohsiung (TW); Chun-Yi Kuo, Kaohsiung (TW)

(73) Assignee: San Fang Chemical Industry Co., Ltd., Kaohsiung (TW)

( * ) Notice: Subject to any disclaimer, the term of this patent is extended or adjusted under 35 U.S.C. 154(b) by 111 days.

(21) Appl. No.: 14/687,067

(22) Filed: Apr. 15, 2015

(65) Prior Publication Data

US 2015/0217501 A1   Aug. 6, 2015

Related U.S. Application Data

(62) Division of application No. 13/760,541, filed on Feb. 6, 2013, now abandoned.

(30) Foreign Application Priority Data

Feb. 15, 2012   (TW) .............................. 101104983 A

(51) Int. Cl.
*A63B 45/00*   (2006.01)
*B29C 51/10*   (2006.01)
(Continued)

(52) U.S. Cl.
CPC .............. *B29C 51/10* (2013.01); *A63B 37/02* (2013.01); *A63B 45/00* (2013.01); *B29C 51/12* (2013.01);
(Continued)

(58) Field of Classification Search
None
See application file for complete search history.

(56) References Cited

U.S. PATENT DOCUMENTS 5,494,625 A * 2/1996 Hu .................... A63B 41/10
156/147
6,136,125 A   10/2000 Ihara et al.
(Continued)

FOREIGN PATENT DOCUMENTS

CN   101773723 A   7/2010

OTHER PUBLICATIONS

English abstract translation of the Office Action issued on Oct. 23, 2014 issued by SIPO for the counterpart CN Patent Application No. 201210057843.6.
(Continued)

*Primary Examiner* — Barbara J Musser
(74) *Attorney, Agent, or Firm* — WPAT, P.C., Intellectual Property Attorneys; Anthony King

(57) ABSTRACT

The present invention relates to a ball shaped product and a method for making the same. The method includes the following steps of: (a) placing a ball shaped interior material on a supporting seat, wherein a part of an outer surface of the ball shaped interior material is exposed outside the supporting seat; (b) placing the ball shaped interior material and the supporting seat in a chamber; (c) covering a wrapping material on the chamber; (d) vacuum pumping the chamber, so that the wrapping material is attached to the exposed part of the outer surface of the ball shaped interior material; (e) releasing the vacuum of the chamber; and (f) rotating the ball shaped interior material, and repeating the step (a) to step (e) at least one time.

4 Claims, 5 Drawing Sheets

(51) Int. Cl.
    *B29C 51/12* (2006.01)
    *B29D 99/00* (2010.01)
    *A63B 37/02* (2006.01)
    *B29K 101/12* (2006.01)
    *B29K 105/00* (2006.01)
    *B29L 9/00* (2006.01)
    *B29L 22/02* (2006.01)

(52) U.S. Cl.
    CPC ...... *B29D 99/0042* (2013.01); *B29K 2101/12* (2013.01); *B29K 2105/256* (2013.01); *B29L 2009/00* (2013.01); *B29L 2022/02* (2013.01)

(56) References Cited

U.S. PATENT DOCUMENTS

| | | | | |
|---|---|---|---|---|
| 7,854,815 B2* | 12/2010 | Taniguchi | ............... | A63B 41/08 |
| | | | | 156/146 |
| 8,628,634 B2* | 1/2014 | Marty | .................... | B29C 51/08 |
| | | | | 156/212 |
| 2005/0000630 A1 | 1/2005 | Shiotsu | | |

OTHER PUBLICATIONS

English translation of the Search Report issued on Oct. 23, 2014 issued by SIPO for the counterpart CN Patent Application No. 201210057843.6.

English abstract translation of the Office Action issued on Jun. 9, 2015 issued by SIPO for the counterpart CN Patent Application No. 201210057843.6.

\* cited by examiner

METHOD FOR MAKING A BALL SHAPED PRODUCT

BACKGROUND OF THE INVENTION

1. Field of the Invention

The present invention relates to a ball shaped product and a method for making the same, and more particularly to a ball shaped product and a method for making the same by using vacuum suction.

2. Description of the Related Art

Among various types of balls, considering a simple ball body, the entire ball body is formed by means of directly injection molding a rubber material. Based on the requirements of appearance, tactile, texture, or sports competition, a machine sewing process or hand sewing process is further developed. In such process, a bladder needs to be disposed inside the ball body for reason of sewing, the air is filled into the bladder during inflation, such that the bladder inflates the ball body, and then a surface cover of the ball is machine sewn or hand sewn onto the bladder. Conventionally, materials for making the surface cover of the ball include thermoplastic urethane (TPU), polyvinyl chloride (PVC), and polyurethane (PU), which are nonfoamed or single-layer foamed.

The conventional ball making process has disadvantages of consuming much labor and time, and having a bottleneck in terms of production capacity, yield and quality. In addition, only a small range of materials can be used.

Therefore, it is necessary to provide a novel and inventive ball shaped product and method for making the same to solve the above problems.

SUMMARY OF THE INVENTION

The present invention provides a method for making a ball shaped product, comprising the following steps of: (a) placing a ball shaped interior material on a supporting seat, wherein a part of an outer surface of the ball shaped interior material is exposed outside the supporting seat; (b) placing the ball shaped interior material and the supporting seat in an accommodating space of a chamber, wherein the chamber has an opening; (c) covering a wrapping material on the opening of the chamber; (d) vacuum pumping the chamber, so that the wrapping material is attached to the exposed part of the outer surface of the ball shaped interior material; (e) releasing the vacuum of the chamber; and (f) rotating the ball shaped interior material, and repeating the step (a) to step (e) at least one time.

The present invention further provides a method for making a ball shaped product, comprising the following steps of: (a) placing a ball shaped interior material on a first supporting seat, wherein a first outer surface of the ball shaped interior material is exposed outside the first supporting seat; (b) placing the ball shaped interior material and the first supporting seat in an accommodating space of a first chamber, wherein the first chamber has an opening; (c) covering a first wrapping material on the opening of the first chamber; (d) vacuum pumping the first chamber, so that the first wrapping material is attached to the first outer surface of the ball shaped interior material; (e) releasing the vacuum of the first chamber; (f) rotating the ball shaped interior material, and then placing the ball shaped interior material on a second supporting seat, wherein a second outer surface of the ball shaped interior material is exposed outside the second supporting seat; (g) placing the ball shaped interior material and the second supporting seat in an accommodating space of a second chamber, wherein the second chamber has an opening; (h) covering a second wrapping material on the opening of the second chamber; and (i) vacuum pumping the second chamber, so that the second wrapping material is attached to the second outer surface of the ball shaped interior material.

In the present invention, a large area can be wrapped in each vacuum wrapping process, and the vacuum wrapping process is fast and thus can save labor and time, and improves the production capacity, yield and quality. In addition, a wide range of materials can be used.

The present invention further provides a ball shaped product, comprising a ball shaped interior material and less than four wrapping materials. The wrapping materials are adhered to the ball shaped interior material.

BRIEF DESCRIPTION OF THE DRAWINGS

The invention will be described according to the appended drawings in which.

PREFERRED EMBODIMENT OF THE PRESENT INVENTION

Figure 1:
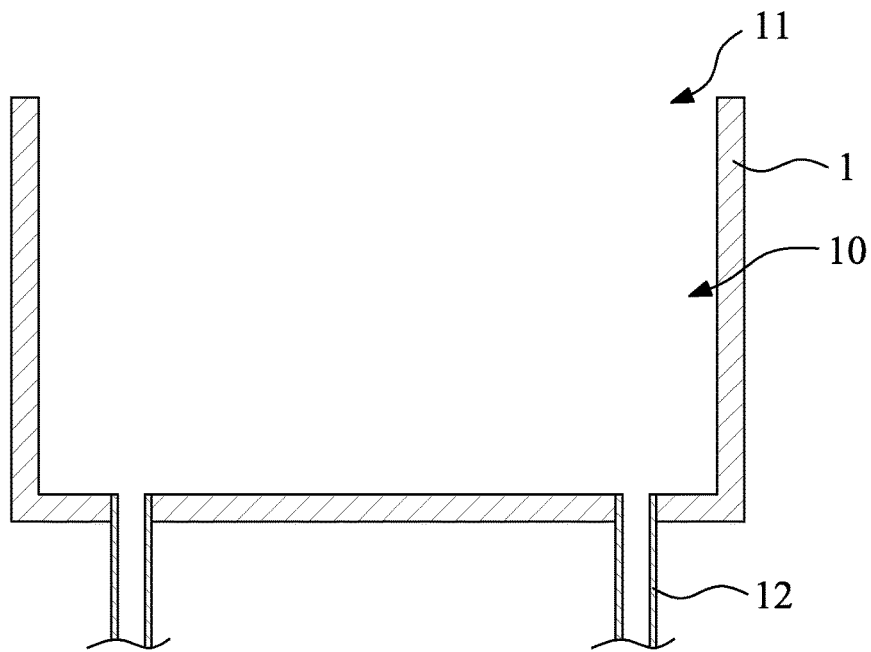
FIGS. 1 to 8 are schematic views of an embodiment of a method for making a ball shaped product of the present invention.

FIGS. 1 to 8 are schematic views of an embodiment of a method for making a ball shaped product of the present invention. Referring to FIG. 1, a first chamber 1 is provided. In this embodiment, the first chamber 1 is a vacuum wrapping machine, having an accommodating space 10, an opening 11 and at least one vacuum channel 12.

Figure 2:
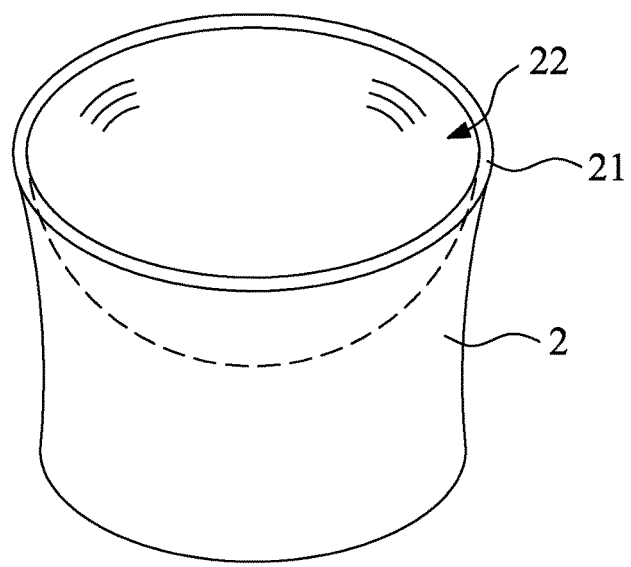

Referring to FIG. 2, a first supporting seat 2 is provided. In this embodiment, the first supporting seat 2 has an outer periphery 21, which defines a recess 22. The recess 22 may be half of a perfect spherical shape, half of an elliptical spherical shape, half of an egg shape or half of other spherical shapes. In other embodiments, the recess 22 may be one third, two thirds, one quarter, three quarters or other proportions of a spherical shape. An upper end of the outer periphery 21 is located at the same horizontal height, that is, the upper end of the outer periphery 21 is a plane.

Figure 3:
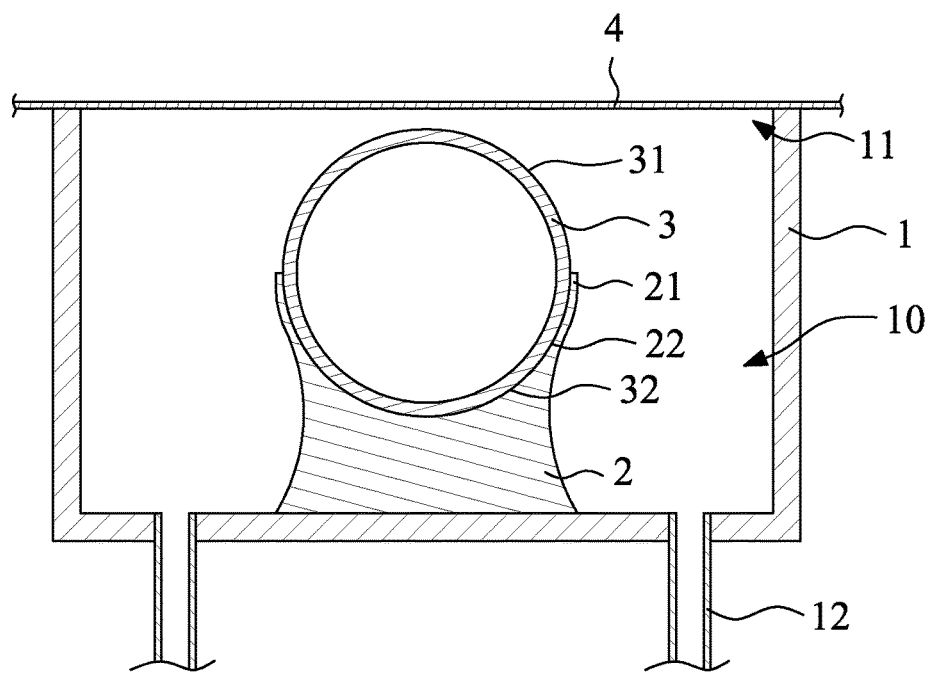

Referring to FIG. 3, a ball shaped interior material 3 is placed on the first supporting seat 2. In this embodiment, the ball shaped interior material 3 is a bladder and may have a perfect spherical shape, an elliptical spherical shape, an egg shape or other shapes. The ball shaped interior material 3 is received in the recess 22, that is, a part of an outer surface of the ball shaped interior material 3 is exposed outside the first supporting seat 2, and the other part of the outer surface is surrounded by the outer periphery 21 of the first supporting seat 2. In this embodiment, a first outer surface 31 of the ball shaped interior material 3 is exposed outside the first supporting seat 2, and a second outer surface 32 of the ball shaped interior material 3 is surrounded by the outer periphery 21 of the first supporting set 2.

Then, the ball shaped interior material 3 and the first supporting seat 2 are placed in the accommodating space 10 of the first chamber 1. In this embodiment, the method further includes a step of forming an adhesive layer (not shown) on the first outer surface 31. It should be understood that, if the outer surface of the ball shaped interior material 3 is adhesive, this step may be omitted.

Then, a first wrapping material 4 is completely covered on the opening 11 of the first chamber 1. In this embodiment, the material of the first wrapping material 4 is thermoplastic urethane (TPU), polyurethane (PU), rubber, polyvinyl chloride (PVC), nylon, polyethylene terephthalate (PET) or polycarbonate (PC). Preferably, the first wrapping material 4 has an adhesive layer (not shown) on a lower surface thereof, and has texture on an upper surface thereof.

Figure 4:
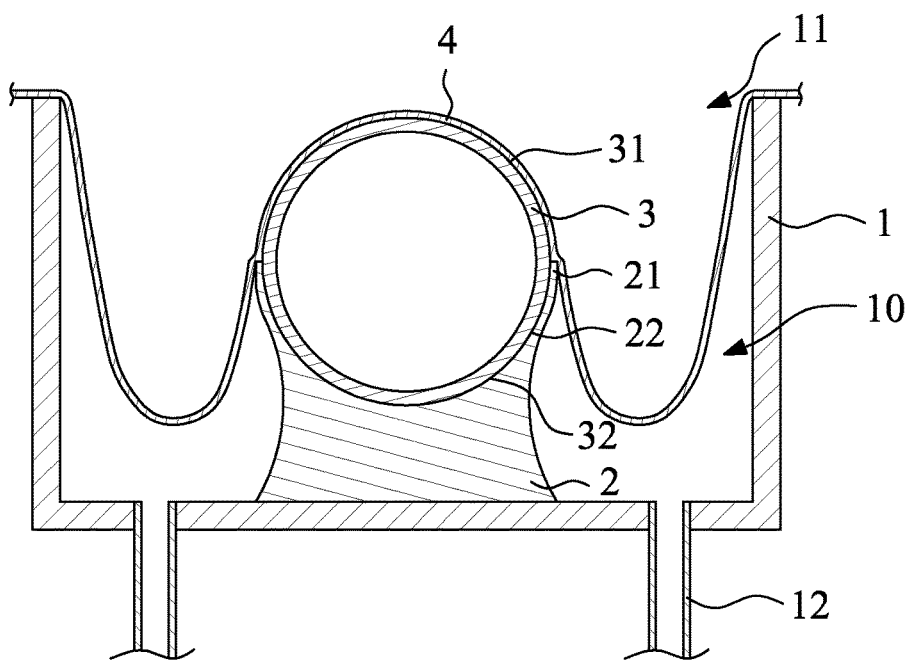

Referring to FIG. 4, the first chamber 1 is vacuum pumped through the vacuum channel 12, so that the first wrapping material 4 is drawn down rapidly by vacuum suction, and then attached to the exposed part of the outer surface (that is, the first outer surface 31) of the ball shaped interior material 3. In this embodiment, the first wrapping material 4 is adhered to the exposed part of the outer surface (that is, the first outer surface 31) of the ball shaped interior material 3. Preferably, the temperature of the first chamber 1 is controlled between room temperature and 250° C.

Figure 5:
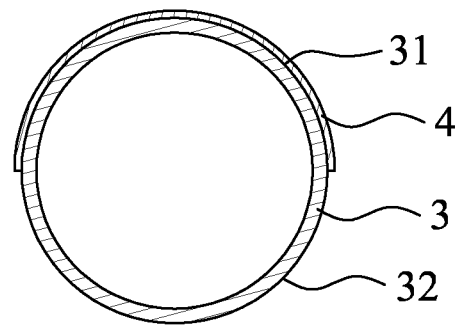

Referring to FIG. 5, after the vacuum of the first chamber 1 is released, the first wrapping material 4 that is not attached to the ball shaped interior material 3 is cut away, so that only the first wrapping material 4 located on the first outer surface 31 is left. In other embodiments, the cutting step at this time may be omitted, and an excess of the wrapping material is cut away once for all after the wrapping process is completed.

Figure 6:
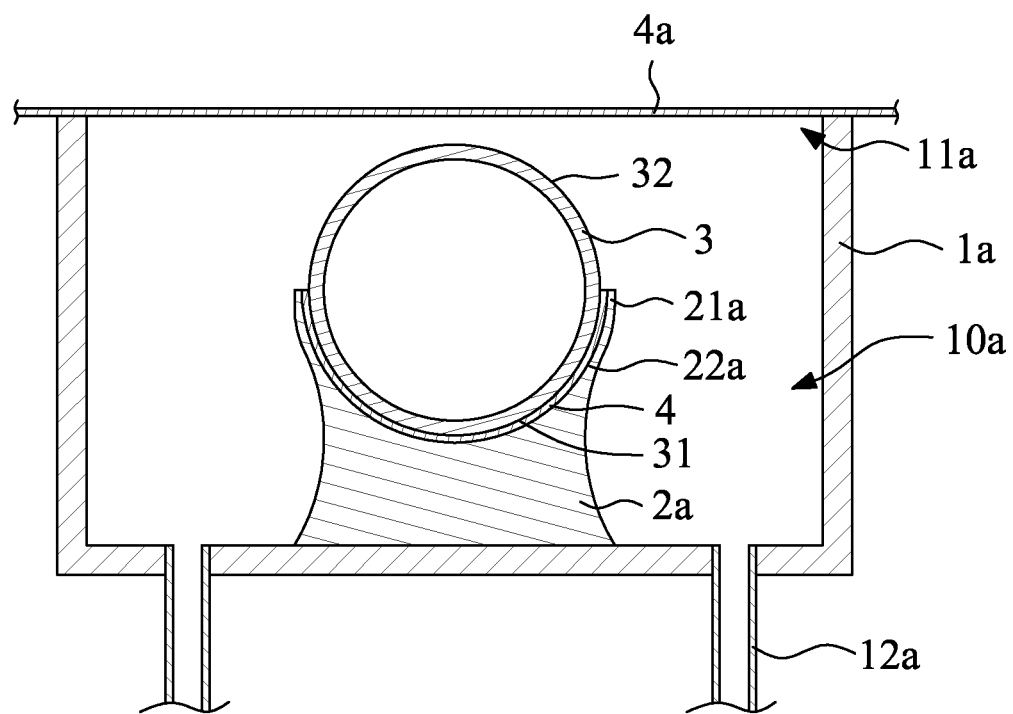

Referring to FIG. 6, the ball shaped interior material 3 is rotated, and then placed on a second supporting seat 2a, wherein the second outer surface 32 of the ball shaped interior material 3 is exposed outside the second supporting seat 2a. The second supporting seat 2a has an outer periphery 21a, which defines a recess 22a. In this embodiment, the second supporting seat 2a and the first supporting seat 2 are the same supporting seat, or different supporting seats having the same appearance, because the recesses 22 and 22a are each half of a perfect spherical shape. In other embodiments, the second supporting seat 2a and the first supporting seat 2 may be supporting seats having different appearances.

Then, the ball shaped interior material 3 and the second supporting seat 2a are placed in an accommodating space 10a of a second chamber 1a. The second chamber 1a is a vacuum wrapping machine, having the accommodating space 10a, an opening 11a and at least one vacuum channel 12a. In this embodiment, the second chamber 1a and the first chamber 1 are the same chamber; however, in other embodiments, the second chamber 1a and the first chamber 1 are different chambers. In this embodiment, the method further includes a step of forming an adhesive layer (not shown) on the second outer surface 32. It should be understood that, if the outer surface of the ball shaped interior material 3 is adhesive, this step may be omitted.

Then, a second wrapping material 4a is completely covered on the opening 11a of the second chamber 1a. In this embodiment, the material of the second wrapping material 4a is thermoplastic urethane (TPU), polyurethane (PU), rubber, polyvinyl chloride (PVC), nylon, polyethylene terephthalate (PET) or polycarbonate (PC). Preferably, the second wrapping material 4a has an adhesive layer (not shown) on a lower surface thereof, and has texture on an upper surface thereof. The second wrapping material 4a and the first wrapping material 4 are the same or different.

Figure 7:
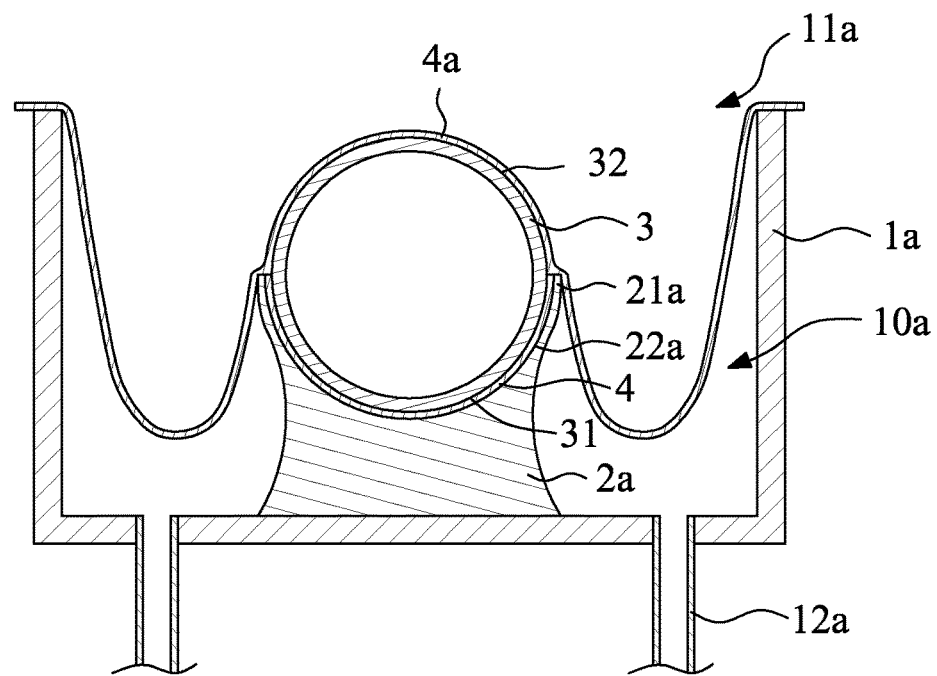

Referring to FIG. 7, the second chamber 1a is vacuum pumped through the vacuum channel 12a, so that the second wrapping material 4a is drawn down rapidly by vacuum suction, and then attached to the exposed part of the outer surface (that is, the second outer surface 32) of the ball shaped interior material 3. In this embodiment, the second wrapping material 4a is adhered to the exposed part of the outer surface (that is, the second outer surface 32) of the ball shaped interior material 3.

Figure 8:
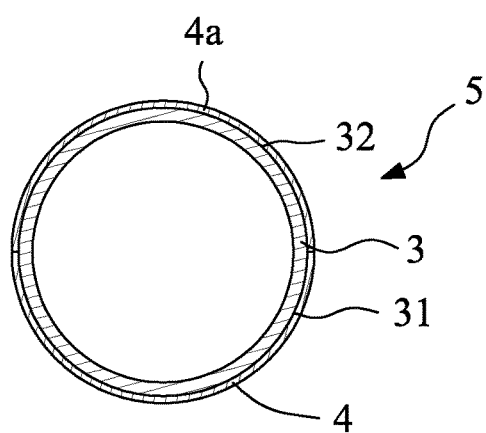

Referring to FIG. 8, after the vacuum of the second chamber 1a is released, the second wrapping material 4a that is not attached to the ball shaped interior material 3 is cut away, thus fabricating a ball shaped product 5. It should be understood that, if the first wrapping material 4 that is not attached to the ball shaped interior material 3 is not cut away in the step of FIG. 5, the cutting step at this time is cutting away the first wrapping material 4 and the second wrapping material 4a that are not attached to the ball shaped interior material 3.

Figure 9:
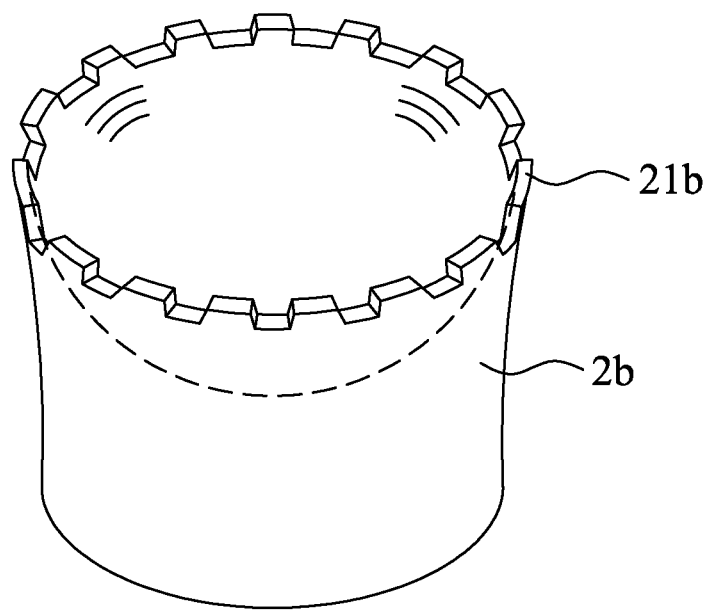
FIG. 9 is a schematic view of another embodiment of a supporting seat used in the method for making a ball shaped product of the present invention.

FIG. 9 is a schematic view of another embodiment of a supporting seat used in the method for making a ball shaped product of the present invention. The supporting seat 2b of this embodiment is substantially the same as the first supporting seat 2 shown in FIG. 2, except that the upper end of the outer periphery 21b of the supporting seat 2b has ridges and valleys, for example, a tooth shape. It should be understood that, the outer periphery 21b of the supporting seat 2b may also have other shapes.

In this embodiment, the vacuum wrapping process is performed two times. However, in other embodiments, if a specially designed supporting seat is provided, the vacuum wrapping process may also be performed three times or more than four times, with one third or less than one quarter of the ball shaped interior material 3 being wrapped each time.

In this embodiment, a large area can be wrapped in each vacuum wrapping process, and the vacuum wrapping process is fast and thus can save labor and time, and improves the production capacity, yield and quality. In addition, a wide range of materials can be used.

FIG. 8 is a schematic cross-sectional view of an embodiment of a ball shaped product of the present invention. The ball shaped product 5 includes a ball shaped interior material 3 and a plurality of wrapping materials. The wrapping materials are adhered to the ball shaped interior material 3. In this embodiment, the ball shaped interior material 3 is a bladder and may have a perfect spherical shape, an elliptical spherical shape, an egg shape or other shapes. The ball shaped interior material 3 has a first outer surface 31 and a second outer surface 32. The number of the wrapping materials is two, which are respectively a first wrapping material 4 and a second wrapping material 4a. The first wrapping material 4 and the second wrapping material 4a are respectively adhered to the first outer surface 31 and the second outer surface 32 of the ball shaped interior material 3 by vacuum suction.

The material of the first wrapping material 4 is thermoplastic urethane (TPU), polyurethane (PU), rubber, polyvinyl chloride (PVC), nylon, polyethylene terephthalate (PET) or polycarbonate (PC). The material of the second wrapping material 4a is thermoplastic urethane (TPU), polyurethane (PU), rubber, polyvinyl chloride (PVC), nylon, polyethylene terephthalate (PET) or polycarbonate (PC). The second wrapping material 4a and the first wrapping material 4 are the same or different.

Preferably, the ball shaped product 5 further includes an adhesive layer (not shown), located between the ball shaped interior material 3 and the wrapping materials 4 and 4a. In this embodiment, the number of the wrapping materials is two; however, in other embodiments, the number of the wrapping materials may be three or more than four.

The principle and the efficacies of the present invention have been disclosed above, and are not intended to limit the present invention.

Therefore, modifications and variations of the embodiments made by persons skilled in the art do not depart from the spirit of the present invention. Therefore, the protection scope of the present invention is defined by the scope of the following claims.

What is claimed is:

1. A method for making a ball shaped product, comprising:
   (a) placing a ball shaped interior material on a supporting seat, wherein a part of an outer surface of the ball shaped interior material is exposed outside the supporting seat;
   (b) placing the ball shaped interior material and the supporting seat in an accommodating space of a chamber, wherein the chamber has an opening;
   (c) covering a wrapping material on the opening of the chamber;
   (d) vacuum pumping the chamber, so that the wrapping material is attached to the exposed part of the outer surface of the ball shaped interior material;
   (e) releasing the vacuum of the chamber; and
   (f) rotating the ball shaped interior material, and repeating the step (a) to step (e) at least one time.

2. The method according to claim 1, wherein in the step (c), the material of the wrapping material is thermoplastic urethane (TPU), polyurethane (PU), rubber, polyvinyl chloride (PVC), nylon, polyethylene terephthalate (PET) or polycarbonate (PC).

3. The method according to claim 1, wherein in the step (c), the wrapping material has an adhesive layer.

4. The method according to claim 1, wherein after the step (e) or step (f), the method further comprises a step of cutting away the wrapping material that is not attached to the ball shaped interior material.

* * * * *